(12) United States Patent
Conley, Jr.

(10) Patent No.: US 10,827,724 B1
(45) Date of Patent: Nov. 10, 2020

(54) DOG WALKING AND WATERING DEVICE

(71) Applicant: Hershel Edward Conley, Jr., Mountain Home, AR (US)

(72) Inventor: Hershel Edward Conley, Jr., Mountain Home, AR (US)

( * ) Notice: Subject to any disclaimer, the term of this patent is extended or adjusted under 35 U.S.C. 154(b) by 0 days.

(21) Appl. No.: 16/120,011

(22) Filed: Aug. 31, 2018

(51) Int. Cl.
*A01K 7/00* (2006.01)
*A45B 3/00* (2006.01)

(52) U.S. Cl.
CPC . *A01K 7/00* (2013.01); *A45B 3/00* (2013.01)

(58) Field of Classification Search
CPC ... A01K 7/00; A01K 7/02; A01K 1/04; A01K 7/06; A01K 39/02; A01K 7/025; A01K 5/00; A01K 5/01; A01K 5/0114; A01K 5/0142; E01H 1/12; E01H 1/1206; E01H 1/1213; E01H 2001/1273; B67D 2001/0812; B67D 2001/0814; B67D 2001/082; B67D 1/0889; B67D 3/0025; B67D 3/0029; B67D 3/0032; B67D 3/0035; B67D 3/0038; B67D 3/0041; B67D 3/008; B67D 3/0083; A45B 3/00
See application file for complete search history.

(56) References Cited

U.S. PATENT DOCUMENTS

| | | | | |
|---|---|---|---|---|
| 2,958,334 A | * | 11/1960 | Curtis | A01K 7/02 137/412 |
| 3,044,447 A | * | 7/1962 | Lenz | A01K 7/02 119/75 |
| 3,782,332 A | * | 1/1974 | Depenthal | A01K 5/0225 119/51.13 |
| 3,809,291 A | * | 5/1974 | Purdy | A01K 7/02 222/145.1 |
| 3,827,405 A | * | 8/1974 | Allen | A01K 39/0125 119/53 |
| 4,173,948 A | * | 11/1979 | Austin | A01K 7/00 119/72 |
| 4,281,625 A | * | 8/1981 | Kasai | A01G 27/001 119/77 |
| 4,439,183 A | * | 3/1984 | Theeuwes | A61M 5/1407 604/251 |

(Continued)

FOREIGN PATENT DOCUMENTS

| | | | |
|---|---|---|---|
| JP | 08275688 A | * | 10/1996 |
| JP | 09094035 A | * | 4/1997 |
| JP | 2015057973 A | * | 3/2015 |

*Primary Examiner* — Son T Nguyen
(74) *Attorney, Agent, or Firm* — Schrantz Law Firm, PLLC; Stephen D. Schrantz

(57) ABSTRACT

The dog walking and watering device enables the user to provide his or her dog with water while away from their usual drinking receptacle. Fluid is stored in a fluid source or reservoir and then delivered to a drinking receptacle. A dispensing actuator controls the valves and positions the drinking receptacle of the device. The dispensing actuator adjusts between a transport position and a use position. In the transport position, the drinking receptacle is adjusted inward toward the body of the device and the dispensing valve closes to limit fluid delivered to the drinking receptacle. In the use position, the drinking receptacle is adjusted outward away from the body and the dispensing valve is open are arranged such that fluid flows to the drinking receptacle from the fluid source or reservoir.

6 Claims, 7 Drawing Sheets

(56) References Cited

U.S. PATENT DOCUMENTS

| | | | | |
|---|---|---|---|---|
| 4,463,706 A * | 8/1984 | Meister | A01K 7/02 | 119/51.02 |
| 4,470,374 A * | 9/1984 | Upperman | A01K 45/00 | 119/72 |
| 4,484,909 A * | 11/1984 | Urquhart | A61M 5/1407 | 604/82 |
| 4,540,403 A * | 9/1985 | Theeuwes | A61M 5/172 | 204/630 |
| 4,750,643 A * | 6/1988 | Wortrich | A61M 5/14 | 222/482 |
| 4,829,933 A * | 5/1989 | Van der Veer | A01K 39/02 | 119/78 |
| 5,163,923 A * | 11/1992 | Donawick | A61M 5/1418 | 119/72 |
| 5,884,583 A * | 3/1999 | Johnston, Jr. | A01K 7/02 | 119/72 |
| 6,868,801 B2 * | 3/2005 | Rovira Badia | A01K 5/0225 | 119/51.5 |
| 6,953,007 B1 * | 10/2005 | Cummings | A01K 15/02 | 119/51.01 |
| 7,987,816 B1 * | 8/2011 | Walsh | A01K 5/0114 | 119/61.5 |
| 8,196,549 B2 * | 6/2012 | Seagraves | A01K 39/0213 | 119/477 |
| 8,776,725 B1 * | 7/2014 | Grijalva | A01K 7/00 | 119/51.01 |
| 2004/0134439 A1 * | 7/2004 | Flowers | A01K 7/00 | 119/69.5 |
| 2009/0097902 A1 * | 4/2009 | Lemmon | A47L 11/26 | 401/140 |
| 2013/0112146 A1 * | 5/2013 | Johnson | A01K 5/00 | 119/51.5 |
| 2015/0122185 A1 * | 5/2015 | Lucky | A01K 5/0142 | 119/51.5 |
| 2015/0192933 A1 * | 7/2015 | Hymes | G05D 9/12 | 137/386 |

\* cited by examiner

DOG WALKING AND WATERING DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a device that provides fluid to a dog. The present invention provides a portable dog walking and watering device. The dog walking and watering device allows the user to provide their dog with a measured amount of fresh water when away from the dog's usual water drinking receptacle.

A fluid source, such as a bottle of water or other drink, attaches to the watering device at the source receiver. The user then dispenses the fluid from the fluid source into a drinking receptacle, such as a bowl. The user adjusts a dispensing actuator of the device to dispense water into an adjustable drinking receptacle. The drinking receptacle of the device pivots from a stored position to a use position. In the use position, the dog can drink from the drinking receptacle.

The device also serves as a walking stick or cane. The cane provides the user with stability while walking as well as a sturdy surface to mount the dog watering system. The handle of the device provides an attachment finger to allow the user to secure the dog's leash to the device.

Currently, persons seeking to provide their dogs with water while away from home have limited options. Carrying bulky objects can make it difficult to maintain your balance. Also, dogs are often required to be on a leash when on a walk. It is difficult to carry water and a leash at the same time while maintaining control of a dog.

The dog walking and watering device of the present invention overcomes many disadvantages of current dog walking and watering devices. The device provides a solution to allow the user to carry and deliver water to the user's dog on a walk while also holding the dog's leash and providing stability for the user. Therefore, the present invention is needed to provide a user with a more stable and efficient way to provide water for a dog while away from the dog's typical water drinking receptacle.

II. Description of the Known Art

Patents and patent applications disclosing relevant information are disclosed below. These patents and patent applications are hereby expressly incorporated by reference in their entirety.

U.S. Pat. No. 5,636,592 issued to Wechsler et al. on Jun. 10, 1997 ("the '592 patent") teaches a portable device for feeding animals. The '592 patent teaches a portable device that permits the dispensing of water, potable liquid, particulate solids, and other like flowable feed material to dogs and other animals from a reservoir. The '592 patent teaches that the substance moves from the reservoir into a pooling space for consumption. The '592 patent teaches a trough that has a shape that allows the reservoir to nest within the trough.

The '592 patent teaches two positions of the device. In one position, the reservoir is nested inside the trough. In a second position, the reservoir is brought out of the nesting position. The concave interior of the trough provides the pooling space. The '592 patent teaches that an outlet of the reservoir is in pool feeding communication with the trough to permit at least partial emptying of the contents of the reservoir into the trough.

U.S. Pat. No. 8,893,660 issued to Al-Azemi on Nov. 25, 2014 ("the '660 patent") teaches a portable suspended device for watering bees and birds. The '660 patent teaches that the device dispenses drinking and cooling water. The device taught by the '660 patent provides a support rod, suspension hook, insulated water reservoir, and a dish-like container. The '660 patent teaches that the device is designed to be suspended form a support such as a tree limb or wall.

In one embodiment taught by the '660 patent, a porous, fibrous dispensing structure allows the water to drip from the reservoir into the dish. In another embodiment taught by the '660 patent, the device incorporates an elongated tube with an opening for conveying water from the reservoir to the dish.

U.S. Pat. No. 9,232,772 issued to Majcen et al. on Jan. 12, 2016 ("the '772 patent") teaches a pet leash incorporating compartments for storage and pet care ancillary supplies. The '772 patent teaches a multi-purpose pet leash for tethering an animal with a plurality to better care for a pet on the go. The leash taught by the '772 patent incorporates dispensable disposable bag(s), a reservoir for storing a dispensable product like water or food, and a detachable deployable dish for holding the dispensable product.

Therefore, the present invention is needed to improve the ability to provide water to a pet while away. The present invention is also needed to provide a portable watering system. The present invention is also need to provide a watering system designed for walks, hikes, or other adventures by foot. The device may serve as a cane or walking stick for additional support to the user.

SUMMARY OF THE INVENTION

The dog walking and watering device of the present invention delivers fluid such as water to a dog. The device provides an adjustable drinking receptacle that receives a fluid, such as water, from a fluid source secured to the source adapter. The fluid in the source flows through a conduit from the source adapter into the drinking receptacle.

The fluid source secures to the device via the source receiver. In one embodiment, the fluid source is a container filled with a drink, such as a water bottle, a beverage container, or other bottle. A metering valve regulates flow from the source receiver to a reservoir. A dispensing valve regulates flow from the reservoir to the drinking receptacle. The valves control the flow of the fluid from the source receiver to the reservoir and the flow of the fluid from the reservoir to the drinking receptacle.

A pressurization conduit secures to the source receiver to provide a more consistent flow from the source and the reservoir. Air flows through the pressurization conduit from outside the device into the fluid source. Such air flow assists with the flow of the fluid from the fluid source to the reservoir when the metering valve is in the open position.

In one embodiment, the device fills the drinking receptacle while the receptacle is pivoted outward in the use position. To avoid overfilling the receptacle, the present invention provides a reservoir that stores a metered amount of fluid. Such a reservoir fills the receptacle. A metering valve closes the flow from the source to limit flow of the fluid from the source while filling the receptacle. Closing the metering valve allows the animal, such as a dog, to continue drinking while limiting flow of the fluid from the source.

The reservoir fills with fluid from the fluid source. A dispensing valve controls the flow of fluid from the reservoir into the drinking receptacle. Fluid exits the reservoir through a dispensing valve and flows through a fluid outlet. The fluid outlet delivers fluid from the reservoir to the drinking receptacle.

A handle allows the user to grip, control, and transport the device. In one embodiment, the handle of the device provides a leash attachment finger. The handle also provides a dispensing actuator which controls the valves and drinking receptacle. In one embodiment, the dispensing actuator is operated manually. In another embodiment, the dispensing actuator electronically controls the valves and the position of the drinking receptacle.

The dispensing actuator controls the flow of the fluid through the valves and the positioning of the drinking receptacle. The dispensing actuator of the device adjusts the drinking receptacle between the use position and the transport position. To dispense fluid from the device, the user adjusts the dispensing actuator from the transport position to the use position. When the user is finished dispensing fluid, the user then adjusts the dispensing actuator to the transport position.

In the use position, the actuator closes the metering valve and opens the dispensing valve. The drinking receptacle pivots outward for the dog to drink from the drinking receptacle. Closing the metering valve limits the amount of fluid flowing from the source to the reservoir. In the use position, the actuator opens the dispensing valve. The open dispensing valve directs flow of the fluid from the reservoir through the fluid outlet to the extended drinking receptacle.

In the transport position, the actuator opens the metering valve and closes the dispensing valve. The actuator pivots the drinking receptacle inwards toward the support body. In the transport position, the source fills the reservoir. Fluid flows from the fluid source through the metering valve to the reservoir to fill the reservoir with fluid. Because the dispensing valve is closed, fluid collects in the reservoir and no fluid is dispensed to the drinking receptacle. The reservoir then dispenses a metered amount of fluid to the drinking receptacle when the actuator is adjusted to the use position.

The device also serves as a walking stick or cane for the user. The support body of the device allows the user to stabilize himself while on a walk or hike with their pet. The handle allows the user to grip and control the device as needed.

Accordingly, it is an object of the present invention to provide a device that delivers fluid to a pet while on a walk.

It is another object of the present invention to provide a device that carries both a fluid source and drinking receptacle.

It is another object of the present invention to eliminate the need for a user to bend down to place a drinking receptacle and to fill the drinking receptacle.

It is another object of the present invention to store both a fluid source and a drinking receptacle on a support body.

It is another object of the present invention to dispense a metered amount of fluid into a drinking receptacle.

It is another object of the present invention to dispense the fluid into the drinking receptacle while allowing the user to stand.

It is another object of the present invention to reduce the need to bend over or squat down to fill a drinking receptacle.

It is another object of the present invention to provide a stowable water drinking receptacle.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
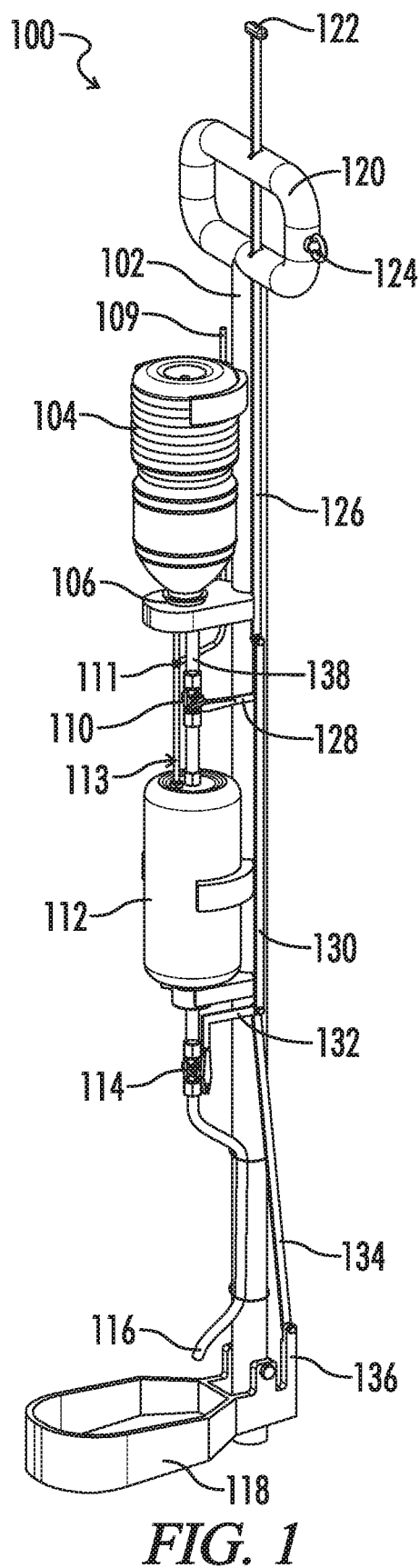
FIG. 1 is a front perspective view of one embodiment of the present invention.

FIGS. 1-4 show the dog walking and watering device 100 of the present invention. Device 100 provides support body 102 that supports various components of device 100. The drinking receptacle 118 and the fluid source 104 secure to the support body 102. The user can then carry the support body 102 with both the drinking receptacle 118 and fluid source 104 attached. The support body 102 also provides the user with additional support by functioning as a walking stick or other support.

The support body 102 is constructed from a rigid material, such as metal or plastic. In one embodiment, the support body 102 is constructed from a lightweight material to decrease the weight of the device. The support body 102 is constructed from a rigid material that can assist the user with walking, hiking, or other activities by foot.

The fluid within the fluid source 104 dispenses into the drinking receptacle 118. In one embodiment, the fluid flows from the fluid source 104 into the drinking receptacle 118. In such an embodiment, a dispensing valve 114 located between the fluid source 104 and the drinking receptacle 118 controls the flow of the fluid from the fluid source 104 into the drinking receptacle 118.

In another embodiment, the fluid flows from the fluid source 104 into a reservoir 112 and then into the drinking receptacle 118. Such an embodiment provides two valves, a metering valve 110 located between the source receiver 106 and reservoir 112, and a dispensing valve 114 located between the reservoir 112 and the drinking receptacle 118.

Source receiver 106 secures to the support body 102. Source receiver 106 accepts fluid source 104. The fluid source 104 attaches to the support body 102 at the source receiver 106. In one embodiment, the source receiver 106 provides a threaded connection that corresponds with a fluid source with a threaded top. The threaded connection secures the fluid source 104 to the source receiver 106.

In one embodiment, fluid source 104 is a water bottle. Fluid source 104 stores the fluid until the dispensing actuator 122 opens the valve to deliver the fluid to drinking receptacle 118.

The attachment of the fluid source 104 with the source receiver 106 enables flow of the fluid within the fluid source 104 to the metering valve 110. If the metering valve 110 is open, the fluid flows to the reservoir 112. If the metering valve 110 is closed, the fluid stops at the metering valve 110. In one embodiment, the metering valve 110 is open when the dispensing actuator 122 is positioned in the transport position. Opening the metering valve 110 in the transport position of such an embodiment fills the reservoir 112. The fluid source fills the reservoir 112 for usage.

Dispensing actuator 122 controls the position of drinking receptacle 118. In one embodiment, the dispensing actuator 122 is operated manually. The drinking receptacle adjusts between a transport position and a use position.

Dispensing actuator 122 controls adjustment arms 126, 130, 134, metering finger 128, dispensing finger 132, and drinking receptacle finger 136.

To dispense fluid to drinking receptacle 118, the user adjusts dispensing actuator 122 to the use position. Adjustment of the actuator 122 to the use position opens the dispensing valve 114 for flow of the fluid into the bowl. In an embodiment with one valve, the adjustment of the actuator to the use position opens the dispensing valve 114 to release the fluid from the outlet into the bowl. In the embodiment that provides reservoir 112, the adjustment of the dispensing actuator 122 to the use position opens the valve between the reservoir and the outlet. Opening such a valve releases the water from the reservoir out the outlet into the bowl.

The dispensing actuator 122 controls the opening and closing of the metering valve 110 and dispensing valve 114. These valves control the flow of the fluid from the fluid source 104 through the fluid outlet 116 into the drinking receptacle 118. Fluid flows from the fluid source 104 through a source conduit 138 secured to the source receiver 106 to a metering valve 110. In the transport position, the metering valve 110 is open. The fluid travels from the fluid source 104 into the reservoir 112.

The dispensing valve 114 limits the flow of the fluid through the fluid outlet 116. The dispensing valve 114 located between the reservoir 112 and the fluid outlet 116 closes while the dispensing actuator 122 is positioned in the transport position.

Adjusting the dispensing actuator 122 to the use position opens the dispensing valve 114 for the fluid to flow to the drinking receptacle 118. Adjustment of the dispensing actuator 122 to the use position moves adjustment arm 126 causing metering finger 128 to open the dispensing valve 114. The fluid then flows out the fluid outlet 122 into the lowered drinking receptacle 118.

Figure 9:
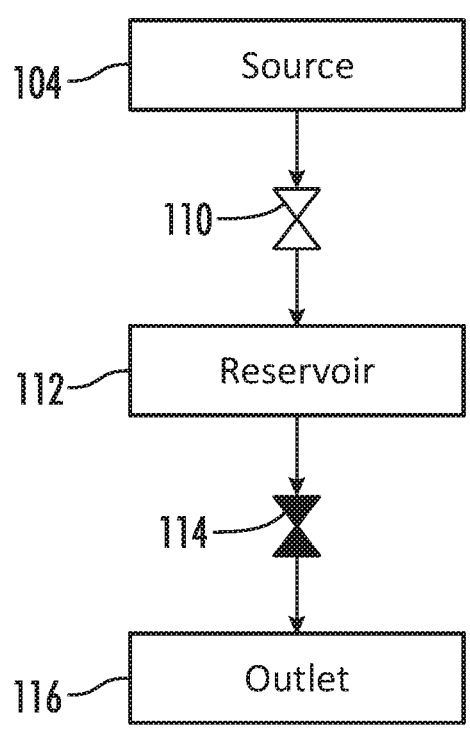
FIG. 9 is a schematic view of one embodiment of the present invention.
Figure 10:
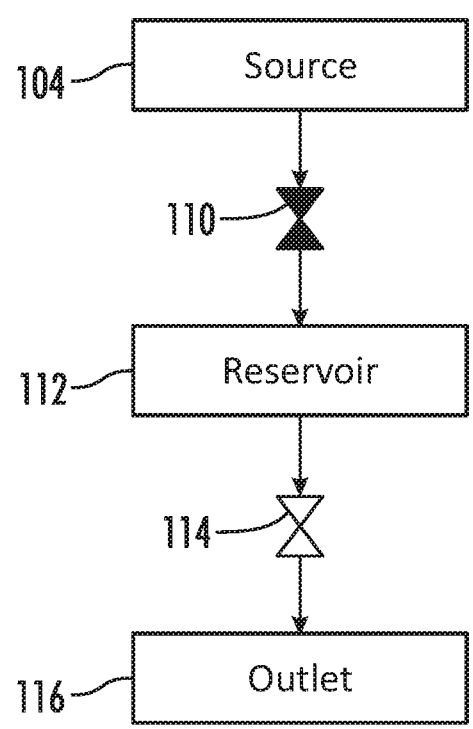
FIG. 10 is a schematic view thereof.

In one embodiment, the metering valve 110 and the dispensing valve 114 alternate between open and closed as shown in FIGS. 9 and 10. In such an embodiment with a reservoir 112, the metering valve 110 remains open while the dispensing valve 114 remains closed as shown in FIG. 9 in the transport position. Likewise, the dispensing valve 114 remains open while the metering valve 110 remains closed as shown in FIG. 10 in the use position to deliver fluid, such as water, to the drinking receptacle.

In such an embodiment, the adjustment of the dispensing actuator 122 to the use position opens the dispensing valve 114 and closes the metering valve 110. Adjustment of the dispensing actuator 122 adjusts metering finger 128 to close the metering valve 110. The adjustment of metering finger 128 also causes adjustment arm 130 to adjust dispensing finger 132 to open the dispensing valve 114.

Figure 2:
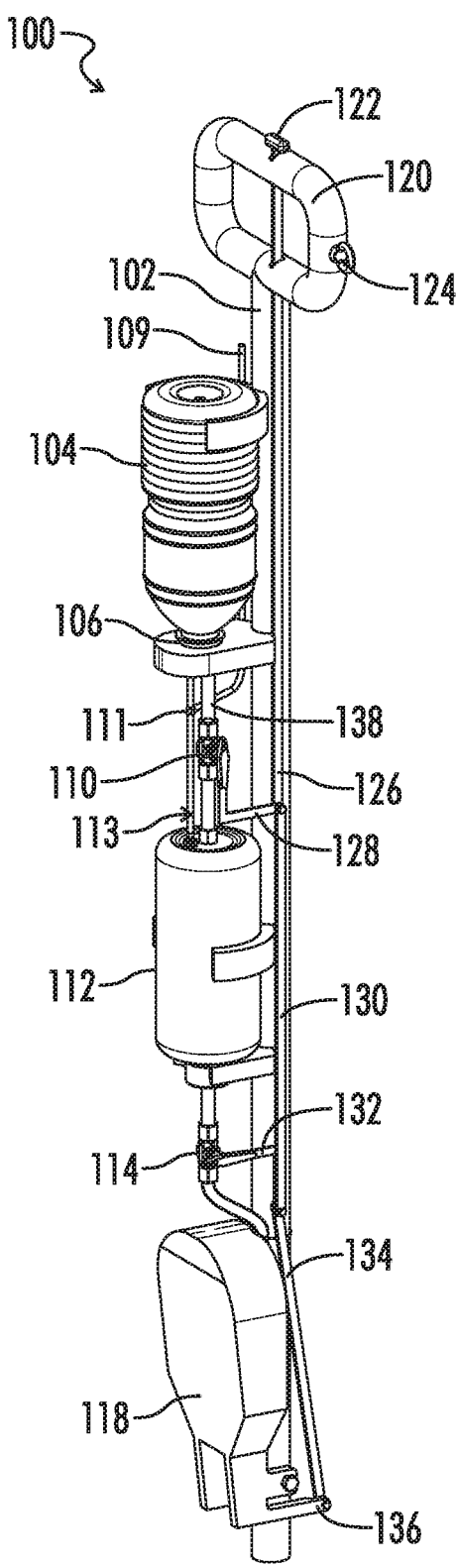
FIG. 2 is a front perspective view thereof.
Figure 3:
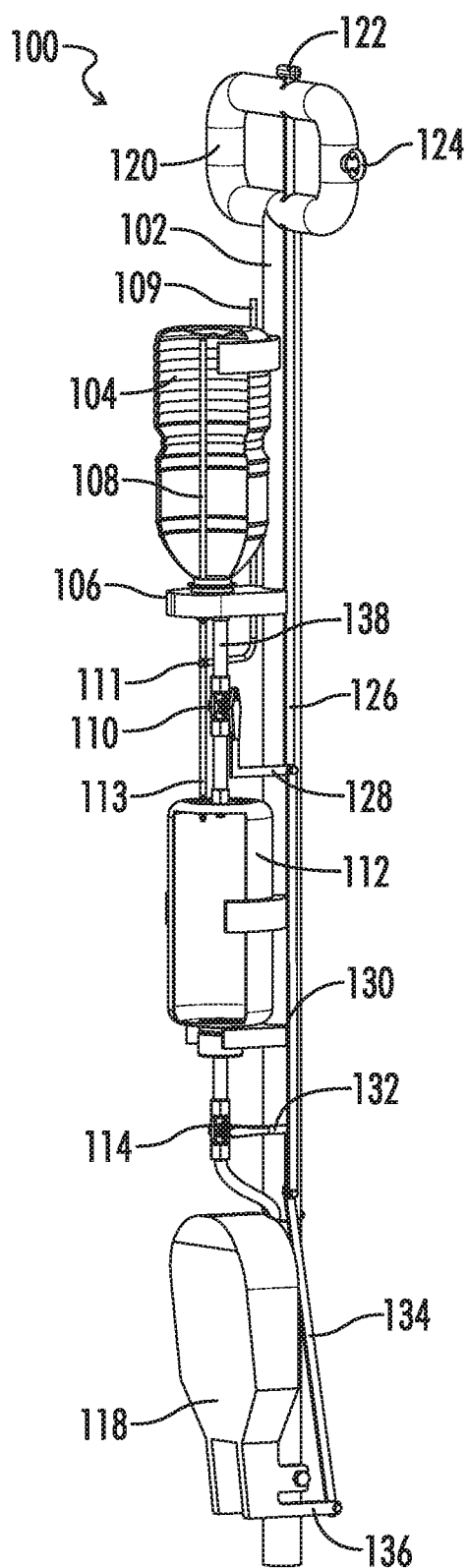
FIG. 3 is a partial view thereof.
Figure 4:
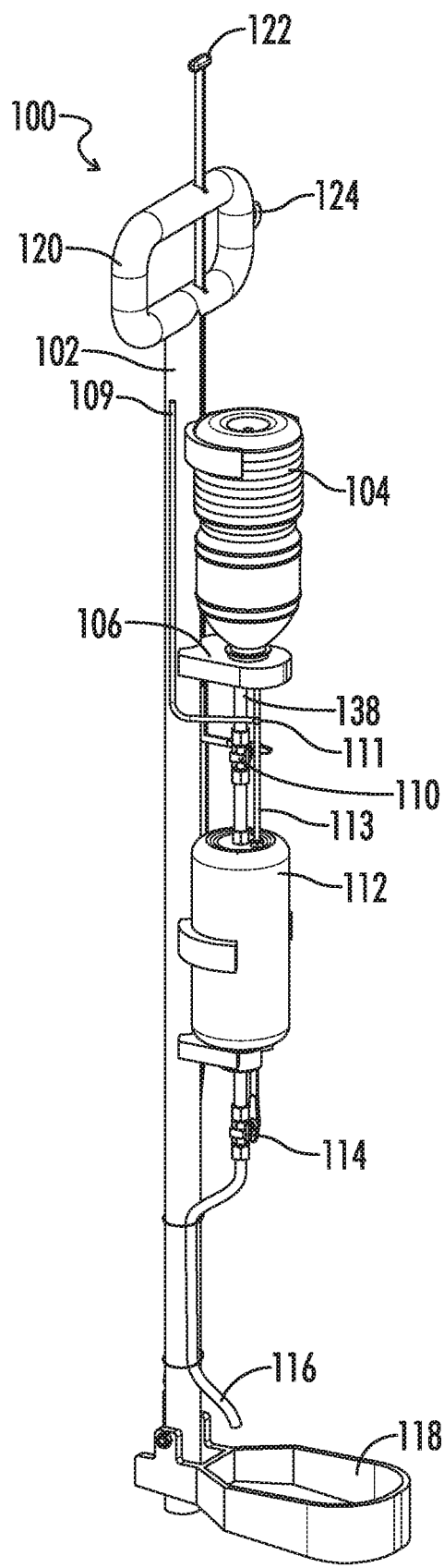
FIG. 4 is a front perspective view thereof.

In the transport position, drinking receptacle 118 is pivoted inward toward the support body 102. In this position, the metering valve 110 is open and the dispensing valve 114 is closed. In the transport position, the dispensing valve 114 is closed to limit fluid delivered to the drinking receptacle 118. In the use position, the drinking receptacle 118 is extended away from the support body 102, metering valve 110 is closed, and dispensing valve 114 is open. In the use position, fluid is delivered to the drinking receptacle 118. FIGS. 2-3 show the device in the transport position. FIGS. 1 and 4 show the device in the use position.

The source receiver 106 connects to a source conduit 138 to direct the fluid to the metering valve 110 and the reservoir 112. The fluid flows from the fluid source 104 into the source receiver 106. The source receiver 106 provides an opening for the fluid to flow to the metering valve 110 and the reservoir 112.

A source pressurization conduit 108 passes through the source receiver 106. In one embodiment, the source pressurization conduit 108 extends above the fill line of the source. The pressurization conduit 108 permits air to enter the fluid source 104. Such air flow assists the flow of the fluid from fluid source 104 through the device 100. Pressurization conduit 108 extends upwards toward handle 120 of device 100.

Metering valve 110 regulates the flow of fluid between fluid source 104 and reservoir 112. Metering valve 110 opens and closes for the flow of the fluid to the reservoir 112. In one embodiment, pivot finger 128 opens and closes metering valve 110. When the metering valve 110 is closed, no fluid flows from fluid source 104 to reservoir 112. In the open position, fluid from fluid source 104 flows through metering valve 110 to reservoir 112. Metering valve 110 is located upstream of reservoir 112 while dispensing valve 114 is located downstream of reservoir 112.

Reservoir 112 attaches to the support body 102. Reservoir 112 stores fluid from fluid source 104 prior to dispensing the fluid to drinking receptacle 118. Reservoir pressurization conduit 113 attaches to the reservoir 112. The reservoir pressurization conduit 113 provides passage for air to flow to and from reservoir 112. The reservoir pressurization conduit 113 assists with the flow of fluid into the reservoir 112 and the flow of fluid out of the reservoir 112 to fill the drinking receptacle 118.

In one embodiment of the present invention, the reservoir 112 stores a measured amount of fluid. This measured amount coincides with the amount of fluid drinking receptacle 118 can receive. The sizing of the reservoir 112 allows the user to dispense an amount of fluid sufficient to fill drinking receptacle 118 without overflowing the drinking receptacle 118.

Dispensing valve 114 controls the flow of fluid from reservoir 112 into drinking receptacle 118. Dispensing valve 114 opens and closes to dispense the fluid into the drinking receptacle 118. Adjustment of dispensing finger 132 opens and closes the dispensing valve. When the dispensing valve 114 is closed, no fluid flows thorough dispensing valve 114. When the dispensing valve 114 is open, fluid from reservoir 112 flows through dispensing valve 114, through fluid outlet 116 into drinking receptacle 118.

Fluid outlet 116 is located downstream of reservoir 112 but upstream of drinking receptacle 118. Fluid outlet 116 directs the flow of fluid from reservoir 112 into drinking receptacle 118 of the device.

Drinking receptacle 118 of the device is pivotally mounted to support body 102. Drinking receptacle 118 adjusts between the transport and use positions. In the transport position, drinking receptacle 118 is pivoted inward towards the support body 102 of the device. In the use position, drinking receptacle 118 pivots down to a position to enable a dog to drink from drinking receptacle 118.

FIGS. 1-4 show handle 120 of device 100. Handle 120 provides dispensing actuator 122 and attachment finger 124.

Attachment finger 124 allows the user to attach various items to the dog walking and watering device. Namely, attachment finger 124 provides a place to attach the user's dog leash. The user may also attach other items to attachment finger 124 including dog waste bags.

FIG. 3 shows a view of the air flow apparatus. Pressurization connector 111 connects ambient pressurization conduit 109, source pressurization conduit 108, and reservoir pressurization conduit 113. Source pressurization conduit 108 provides air flow to and from source receiver 106. Reservoir pressurization conduit 113 provides air flow to and from reservoir 112. Ambient pressurization conduit 109 enables air flow to and from source receiver pressurization conduit 108 and reservoir pressurization conduit 113. Air flow to and from source receiver 106 and reservoir 112 assists with flow of fluid flow to and from source receiver 106 and reservoir 112.

Figure 5:
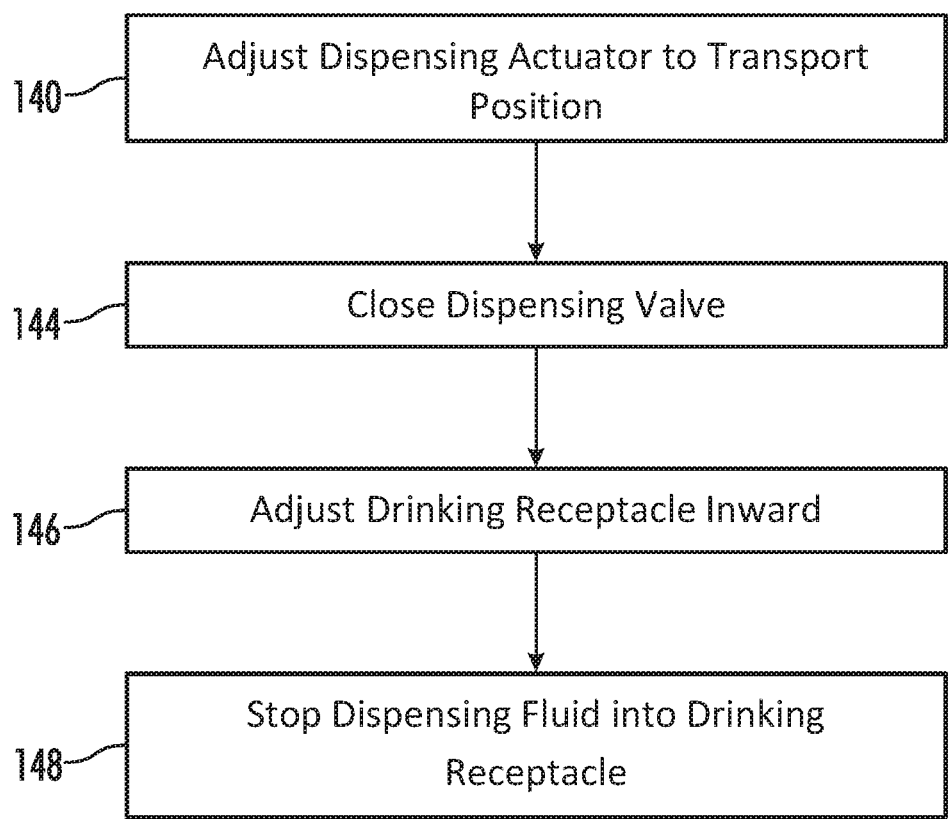
FIG. 5 is a flow chart view of one embodiment of the present invention.
Figure 6:
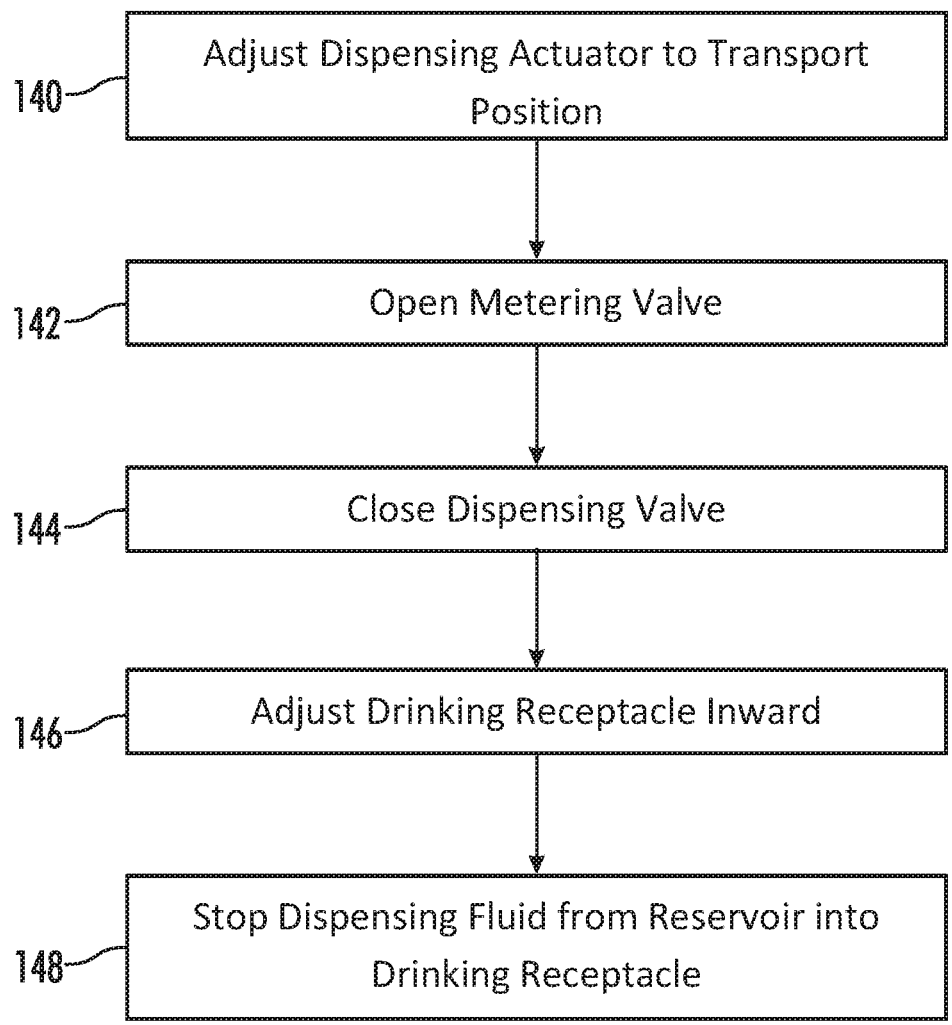
FIG. 6 is a flow chart view of one embodiment of the present invention.

FIGS. 5 and 6 show the operation of the present invention to the transport position. FIG. 5 shows the embodiment with at least one valve. FIG. 6 shows the embodiment with at least two valves. Referring to FIGS. 5 and 6, the user adjusts the dispensing actuator to the transport position at step 140. Adjusting the dispensing actuator to the transport position also closes the dispensing valve at step 144. The drinking receptacle adjusts inwards towards the support body at step 146 due to adjustment of the dispensing actuator. Closing the dispensing valve 146 ceases dispensing of the fluid into the drinking receptacle at step 148.

FIG. 6 shows the operation of the metering valve in connection with the reservoir. The embodiment shown in FIG. 6 operates similarly to the embodiment shown in FIG. 5. FIG. 6 shows the embodiment that dispenses fluid from the reservoir into the drinking receptacle. Closing the dispensing valve at step 144 limits flow of the fluid from the reservoir into the drinking receptacle at step 148. Opening the metering valve at step 142 causes the fluid to flow from the fluid source to the reservoir at step 142. Opening the metering valve at step 142 transfers water from the fluid source to the reservoir. Fluid, such as water, flows from the source into the reservoir past the metering valve. The dispensing valve limits the fluid from flowing from the reservoir into the drinking receptacle.

Figure 7:
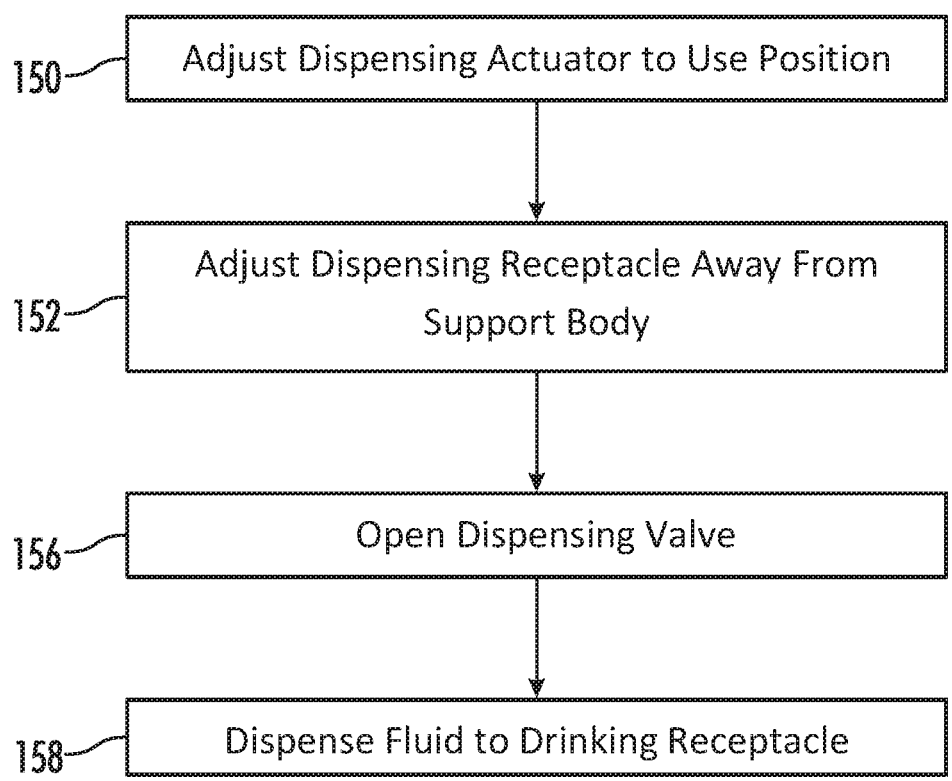
FIG. 7 is a flow chart view of one embodiment of the present invention.
Figure 8:
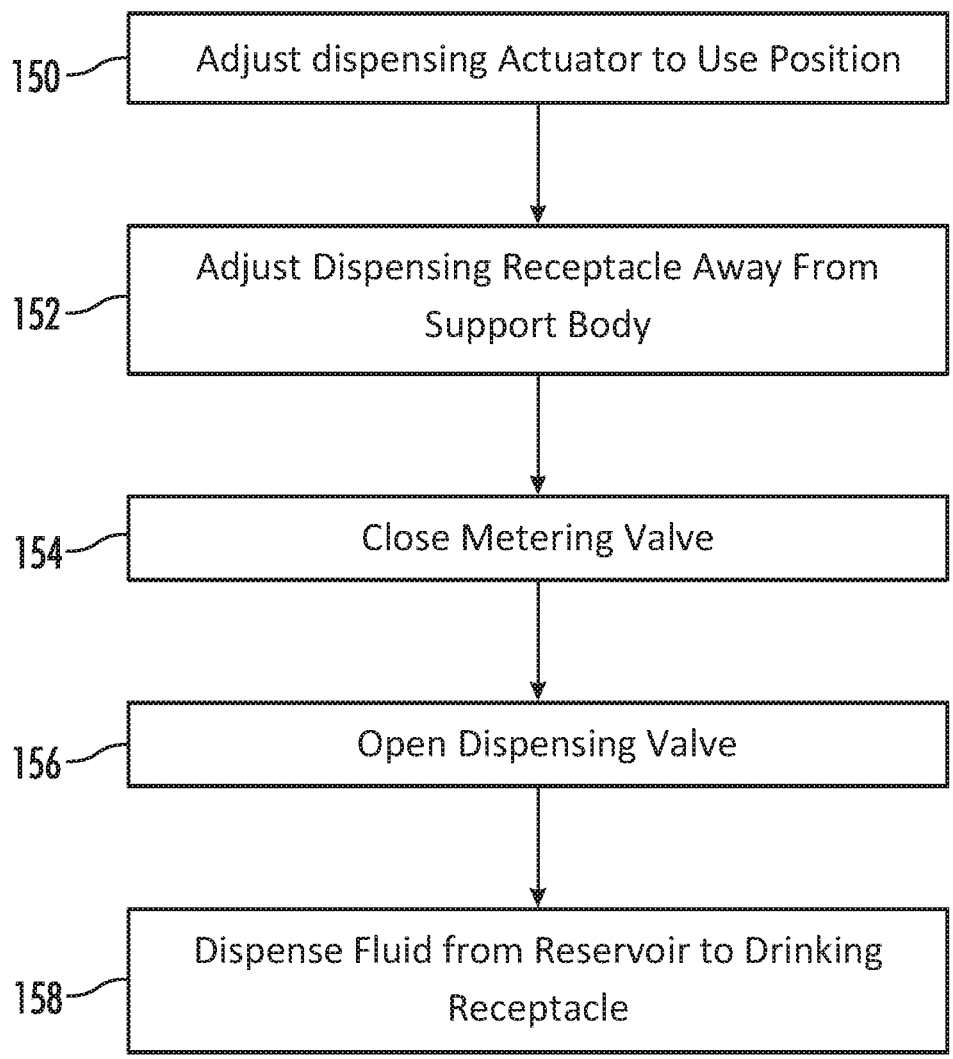
FIG. 8 is a flow chart view of one embodiment of the present invention.

FIGS. 7 and 8 show the use of the present invention while dispensing the fluid into the drinking receptacle. FIG. 7 shows an embodiment with at least one valve. FIG. 8 shows an embodiment with at least two valves. The user adjusts the dispensing actuator to the use position at step 150. Such adjustment of the dispensing actuator adjusts the drinking receptacle away from the support body to the use position at step 152. In one embodiment, such adjustment pivots the drinking receptacle outward. Adjustment of the dispensing actuator to the use position also opens the dispensing valve at step 156 to dispense fluid into the drinking receptacle at step 158.

FIG. 8 shows the operation of the metering valve in connection with the reservoir for filling the drinking receptacle. The embodiment shown in FIG. 8 operates similarly to the embodiment shown in FIG. 7. FIG. 8 shows the dispensing of fluid from the reservoir into the drinking receptacle. Opening the dispensing valve at step 156 dispenses the fluid from the reservoir into the drinking receptacle at step 158. Closing the metering valve at step 152 limits the flow of fluid flow from the fluid source to the reservoir at step 154. Opening the dispensing valve at step 156 transfers water from the reservoir to the drinking receptacle. Fluid, such as water, flows from the reservoir into the drinking receptacle past the dispensing valve. The metering valve limits the fluid from flowing from the source into the reservoir.

The present invention has been shown as a mechanical device that implements rams to open and close the valves and raise and lower the drinking receptacle. Other embodiments may be implemented that electronically open and close the valves and raise and lower the drinking receptacle. The valves may be implemented as a solenoid valve. The adjustment of the drinking receptacle may be implemented mechanically or electronically with a motor or other electric device that can adjust the drinking receptacle.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for providing fluid within a fluid source to an animal, the device comprising:
   an elongated support body constructed from a rigid material;
   a source receiver attached to the support body wherein the source receiver configured to secure the fluid source to the support body;
   a drinking receptacle attached to the support body;
   a fluid outlet configured to direct the fluid exiting the fluid outlet to the drinking receptacle, the fluid outlet located downstream of the source receiver;
   a dispensing valve located downstream of the source receiver and located upstream of the fluid outlet, the dispensing valve opening for fluid to flow out the fluid outlet, the dispensing valve closing to limit the flow of the fluid exiting the fluid outlet;

a metering valve located upstream of the dispensing valve and located downstream of the source receiver, the metering valve opening for fluid to flow from the fluid source towards the dispensing valve, the metering valve closing to limit the flow of the fluid towards the dispensing valve;

a dispensing actuator wherein the dispensing actuator opens the dispensing valve to dispense the fluid into the drinking receptacle and the dispensing actuator closes the dispensing valve to limit the flow of the fluid exiting the fluid outlet;

wherein the dispensing actuator opens the dispensing valve while closing the metering valve, and the dispensing actuator closes the dispensing valve while opening the metering valve.

2. The device of claim 1 further comprising:

a handle of the support body, wherein the dispensing actuator is located on the handle;

an attachment finger protruding outward from the handle to receive a leash.

3. A device for providing fluid within a fluid source to an animal, the device comprising:

an elongated support body constructed from a rigid material;

a source receiver attached to the support body wherein the source receiver configured to secure the fluid source to the support body;

a drinking receptacle pivotally attached to the support body wherein the drinking receptacle adjusts between a transport position pivoted towards the support body and a use position pivoted away from the support body;

a fluid outlet configured to direct the fluid exiting the fluid outlet to the drinking receptacle, the fluid outlet located downstream of the source receiver;

a dispensing valve located downstream of the source receiver and located upstream of the fluid outlet, the dispensing valve opening for fluid to flow out the fluid outlet, the dispensing valve closing to limit the flow of the fluid exiting the fluid outlet;

a dispensing actuator that adjusts between a use position and a transport position, wherein the dispensing actuator opens the dispensing valve to dispense the fluid into the drinking receptacle when adjusted to the use position, and the dispensing actuator closes the dispensing valve to limit the flow of the fluid exiting the fluid outlet when adjusted to the transport position, wherein the dispensing actuator opens the dispensing valve while pivoting the drinking receptacle away from the support body to the use position, wherein the dispensing actuator closes the dispensing valve while pivoting the drinking receptacle towards the support body to the transport position;

a fluid reservoir secured to the support body downstream from the source receiver wherein the fluid reservoir is configured to receive the fluid from the fluid source as the fluid flows downstream from the fluid source to the fluid reservoir, the fluid reservoir located upstream of the dispensing valve, wherein the fluid reservoir is configured to store fluid from the fluid source to be dispensed from the fluid outlet; and a metering valve located downstream of the source receiver and located upstream of the fluid reservoir, the metering valve opening for fluid to flow from the source into the reservoir, the metering valve closing to limit the flow of the fluid into the reservoir.

4. The device of claim 3 wherein the dispensing actuator pivots the drinking receptacle outward from the support body when adjusted to the use position, the dispensing actuator pivots the drinking receptacle inward towards the support body when adjusted to the transport position; and wherein the dispensing actuator closes the metering valve when adjusted to the use position, the dispensing actuator opens the metering valve when adjusted to the transport position.

5. A device for providing fluid within a fluid source to an animal, the device comprising:

an elongated support body constructed from a rigid material;

a source receiver attached to the support body wherein the source receiver configured to secure the fluid source to the support body;

a drinking receptacle pivotally attached to the support body wherein the drinking receptacle adjusts between a transport position pivoted towards the support body and a use position pivoted away from the support body;

a fluid outlet configured to direct the fluid exiting the fluid outlet to the drinking receptacle, the fluid outlet located downstream of the source receiver;

a dispensing valve located downstream of the source receiver and located upstream of the fluid outlet, the dispensing valve opening for fluid to flow out the fluid outlet, the dispensing valve closing to limit the flow of the fluid exiting the fluid outlet;

a dispensing actuator that adjusts between a use position and a transport position, wherein the dispensing actuator opens the dispensing valve to dispense the fluid into the drinking receptacle when adjusted to the use position, and the dispensing actuator closes the dispensing valve to limit the flow of the fluid exiting the fluid outlet when adjusted to the transport position;

wherein the dispensing actuator pivots the drinking receptacle outward from the support body when adjusted to the use position, the dispensing actuator pivots the drinking receptacle inward towards the support body when adjusted to the transport position;

a fluid reservoir secured to the support body downstream from the source receiver wherein the fluid from the fluid source flows downstream to the fluid reservoir, the fluid reservoir located upstream of the dispensing valve, wherein the fluid reservoir stores fluid from the fluid source to be dispensed from the fluid outlet; and a metering valve located downstream of the source receiver and located upstream of the fluid reservoir, the metering valve opening for fluid to flow from the fluid source into the reservoir, the metering valve closing to limit the flow of the fluid into the reservoir;

wherein the dispensing actuator opens the metering valve while closing the dispensing valve, and the dispensing actuator closes the metering valve while opening the dispensing valve.

6. The device of claim 5 wherein the dispensing actuator pivots the drinking receptacle outward from the support body when adjusted to the use position, the dispensing actuator pivots the drinking receptacle inward towards the support body when adjusted to the transport position; and Wherein the dispensing actuator closes the metering valve while opening the dispensing valve and pivoting the drinking receptacle outward from the support body when adjusting the dispensing actuator to the use position, the dispensing actuator opens the metering valve while closing the dispensing valve and pivoting the drinking receptacle towards the support body when adjusting the dispensing actuator to the transport position.

* * * * *